United States Patent [19]

Haines et al.

[11] 3,775,273

[45] Nov. 27, 1973

[54] CADMIUM ELECTRODES

[75] Inventors: Ronald L. Haines; Ian H. S. Henderson, both of Ottawa, Ontario, Canada; Franklin Sievenpiper, Brandon, Fla.

[73] Assignee: Her Majesty the Queen in right of Canada as represented by the Minister of National Defence

[22] Filed: June 26, 1972

[21] Appl. No.: 266,240

Related U.S. Application Data

[63] Continuation-in-part of Ser. No. 1,335, Jan. 8, 1970, abandoned.

[52] U.S. Cl. ............... 204/115, 136/24, 204/292
[51] Int. Cl. .................. C22d 1/22, H01m 43/04
[58] Field of Search ................... 204/292–293, 204/115, 35; 136/24, 28–29, 67

[56] References Cited
UNITED STATES PATENTS

| | | | |
|---|---|---|---|
| 2,830,108 | 4/1958 | Peters | 136/24 |
| 3,062,908 | 11/1962 | Salkind | 136/24 |
| 3,048,644 | 8/1962 | Euler | 136/24 |
| 2,832,813 | 4/1958 | Peters | 136/24 |
| 2,554,125 | 5/1951 | Salauze | 136/24 |

*Primary Examiner*—John H. Mack
*Assistant Examiner*—R. L. Andrews
*Attorney*—Arnold B. Christen et al.

[57] ABSTRACT

The invention relates to a process for the preparation of sponge cadmium electrode material which comprises the steps of compressing the mixture of cadmium oxide and a finely divided inert electronic conductor at a pressure between about 1 psi and 100 psi, and subsequently electrolytically reducing the cadmium oxide to metallic cadmium in an alkaline electrolyte. Preferably the cadmium oxide is used in the form of a powder having a particle size between about 50 microns and 150 microns while the electrolytic conductor is preferably finely divided nickel powder or a metal in filamentary form such as steel wool, nickel wool, or electrolytic copper wool and is furthermore preferably used in a proportion amounting to between 5 and 45 percent by weight of the total mixture. Particularly good results are obtained when the compressing pressure is between about 1 and 4 psi.

13 Claims, 7 Drawing Figures

CADMIUM ELECTRODES

This application is a continuation-in-part of our co-pending application Ser. No. 1,335, filed Jan. 8, 1970, now abandoned.

BACKGROUND OF THE INVENTION

This invention relates to sponge cadmium electrode materials for cells such as mercuric oxide-cadmium; manganese dioxide-cadmium; and cadmium oxide-cadmium cells, and to improved methods of fabricating same. Such cells, although rechargeable a number of times, are generally intended as primary cells.

One of the major difficulties in preparing such cells lies in the production of inexpensive high capacity sponge cadmium anodes. The electronic conductivity of the active mass must be sustained during discharge in spite of the precipitation of poorly conducting cadmium hydroxide, and the electrolytic conductivity must be maintained by the provision of adequate porosity in order to permit free access by the potassium hydroxide electrolyte solution.

Sponge cadmium can be produced by electrolytic reduction in alkaline solution of pressed pellets of cadmium oxide. The resultant metallic cadmium cannot however be easily reoxidized electrolytically because the oxidation product (cadmium hydroxide) is more voluminous than the original cadmium oxide and is also a poor ionic and electronic conductor. Thus sponge cadmium, to be suitable as a battery electrode, must have adequate porosity to permit free access by the alkaline electrolyte and to permit the formation of cadmium hydroxide without appreciable net volume change of the electrode. Further, it must possess a sufficiently high electronic conductivity to permit the oxidation of a large fraction of the metal during battery discharge.

Conventional methods of fabrication of sponge cadmium are either costly in that they involve a large number of steps and the use of relatively expensive materials such as mercury or copper, or they lead necessarily to a voluminous product because of the addition of cellulosic or other materials in an effort to maintain adequate porosity. In U.S. Pat. No. 2,697,737, issued Dec. 21, 1954, Goldberg and Reid described a rechargeable mercuric oxide-cadmium dry cell in which the anode was made by compressing cadmium powder. The powder used was fairly coarse and mercury in quantities up to 20 percent by weight was added to the anode mass to form an amalgam therewith in order to yield a firmer pellet, and also to make the cadmium more electrochemically available. In order to increase porosity and maintain the required state of subdivision during charge-discharge cycling, Roberts, in U.S. Pat. No. 2,448,052, issued Aug. 31, 1948, described the use of expanders of cellulose, diatamaceous earth, kaolin or powdered porcelain in admixture with cadmium oxide. Such expanders give rise to a relatively voluminous product. According to a more recent process described by Matsuno and Iwazaki in Japanese Pat. No. 4020 issued May 26, 1959, porous cadmium electrodes are prepared from a mixture of 75% cadmium chloride and 25 percent zinc chloride fused onto a sintered copper substrate. The zinc chloride is subsequently leached out by sodium hydroxide solution and the porous cadmium chloride reduced to sponge metal. Although adequate porosity can be obtained by this method, the expense and the number of steps involved constitute a considerable disadvantage coupled with the fact that the operating conditions of the method are relatively difficult to control. In U.S. Pat. No. 2,830,108, issued Apr. 8, 1958, Peters describes the preparation of sponge cadmium anodes from mixtures of cadmium, cadmium oxide, and an inert metal (e.g. nickel) powder compressed to 700 to 1,400 kgs. per square centimeter, either in the presence or the absence of a supporting nickel screen or mesh. It has been found, however, that the resultant porosity of the electrodes made by this method is rather low.

In the preparation of sponge cadmium electrodes, it has been found that pressed pellets of cadmium oxide can be quantitatively reduced electrochemically in 30% potassium hydroxide to sponge cadmium, but that following reduction quantitative electro-chemical oxidation does not appear to be possible, the maximum conversion efficiency corresponding to about 10% at the 20 hour rate. In order to improve the electronic conductivity of the active mass, carbonyl nickel powder (INCO type 255) in an amount of 10% by weight was mixed with cadmium oxide prior to pelleting at pressures of 2,000, 3,000 and 4,000 psi. Similar pellets were pressed without added nickel. The pellets, after pressing were approximately 10 millimeters in diameter and 5 millimeters in length. Qualitatively, the lower the pelleting pressure, the greater was the electro-chemical reversibility found to be. The presence of nickel resulted in a further improvement so that a pellet with e.g. 10% nickel prepared at 2,000 psi delivered approximately 25% of its coulombic capacity on discharge at the 20 hour rate.

SUMMARY OF THE INVENTION

It has now been discovered that a very satisfactory sponge cadmium electrode material can be prepared by the electrolytic reduction of mixtures of cadmium oxide with a finely divided inert electronic conductor, providing the mixtures are not compressed too strongly prior to reduction. Electrodes prepared from cadmium oxide, compressed at less than 100 psi., and particularly at from 1 to 4 psi., and electrolytically reduced in 30% potassium hydroxide, showed much higher coulombic efficiencies (up to 75% or more) than electrodes pressed at e.g. 2,000 psi. and the inclusion of means to improve the electronic conductivity of the active mass by the use of nickel powder, expanded nickel mesh, or commercial 2/0 grade steel wool, produced electrodes of considerable practical usefulness. Further, this material can be produced either directly as single cell electrodes or in the form of larger blocks, which may subsequently be cut into smaller segments as electrodes for incorporation into cells.

Thus, according to the present invention, there is provided a process for the preparation of sponge cadmium electrodes which comprises the steps of compressing a mixture of cadmium oxide and finely divided inert electronic conductor, present in an amount of 5 to 25 percent by weight of the total mixture, at a pressure of at least 1 psi. but not exceeding 100 psi. and subsequently electrolytically reducing said cadmium oxide in an alkaline electrolyte. In a preferred feature of the invention a cadmium oxide/nickel mixture is employed. A preferred pressure range is from 1 to 30 psi while a still more preferred range is from 1 to 10 psi and particularly from 1 to 4 psi. The cadmium oxide is preferably of less than 175 microns in particle size, and particularly from 50 microns or somewhat less up to 150 microns.

Although nickel powder having a density of less than 2 gm/cm³, particularly less than 1 gm/cm³ is a preferred electronic conductor, other powders and finely divided forms of material such as iron powders, steel wool, nickel wool, copper wool, copper powder, graphite, carbon black and the like may be used, provided that the material is inert at the anode of a cadmium alkaline cell.

The cadmium oxide finely divided electronic conductor mixture in practice has to be contained in a suitable mold or other container prior to the compressing step. Preferably this container is formed of an inert conductive material, particularly nickel, although it is perfectly possible to use an insulating material if an electrical connection to the compressed mixture is provided e.g. by inserting a wire, foil or mesh, preferably of nickel, into the container along with the powder to be compressed or pressing same into the mixture after compression.

The mixture, after compression at the low pressure utilized in accordance with the invention, particularly if only 1 to 4 p.s.i.g. is employed can only be handled in its container until after electrolytic reduction. However, this presents no problem since the container carrying the compressed mixture and provided with a suitable electrical connection may be readily immersed in alkaline electrolyte such as a 30% aqueous potassium hydroxide solution and electrolytically reduced employing for example a nickel foil anode.

The sponge cadmium produced in accordance with the invention is a soft coherent spongy mass which is quite readily handled without disintegration and is easily cut and shaped, for example with a knife. When permitted to dry out, the reduced material becomes pyrophoric, and hence is normally handled whilst still saturated with potassium hydroxide solution from the reduction step. Electrolytic connection, if not already present, is easily made to the sponge cadmium, e.g. by insertion of a strip of nickel foil or wire when test electrodes have been cut from the reduced material. Cells constructed with sponge cadmium electrodes produced in accordance with this invention are generally intended as primary cells and have a very satisfactory shelf life.

BRIEF DESCRIPTION OF THE DRAWINGS

The invention will now be described further by way of example only and with reference to the accompanying drawings in which.

Figure 1:
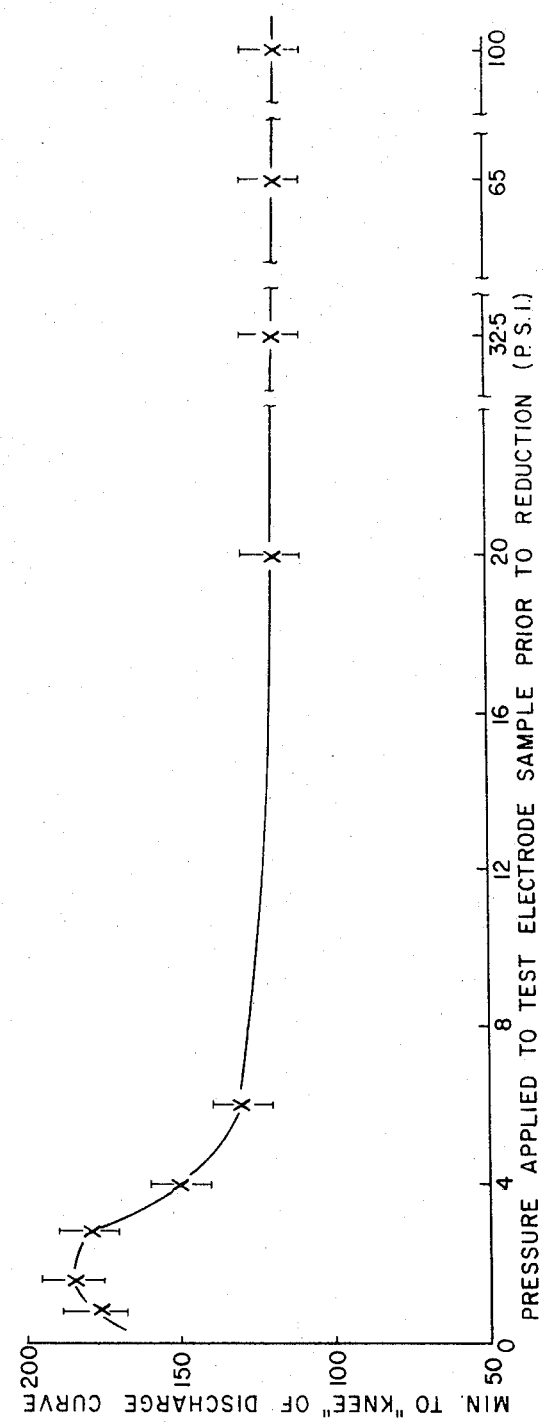
FIGS. 1 to 3 are graphs depicting compressing pressure vs. discharge time; percentage added conductor vs. discharge time; and cadmium oxide particle size distribution vs. discharge time respectively, demonstrating the coulombic efficiencies of various samples of sponge cadmium electrodes prepared in accordance with the invention.

Experiments were carried out in order to assess the coulombic efficiency of sponge cadmium electrodes prepared from cadmium oxide as a function of (a) pre-reduction pelleting pressure; (b) type and percentage of added electronic conductor and (c) cadmium oxide particle size distribution, the results being shown as FIGS. 1 to 3.

All test specimens contained 3.2 gms of chemically pure cadmium oxide powder (1,500 ma hrs) compressed to a pellet 18 mm diameter by 5 mm length. The cells in which the pellets were prepared, reduced and discharged consisted of 25 mm lengths of 18 mm internal diameter acrylic tubing cemented to acrylic base plates. The weighed samples of test material were compressed in the cell by means of a loosely fitting piston which was loaded with weights to yield the desired pressure. The loaded piston was left in place for a standard time (5 minutes) prior to its replacement by a nickel foil counter electrode and the addition of 30% potassium hydroxide electrolyte. The pellet was reduced at 300 ma for 4 hours. This duration of current flow did not correspond to complete reduction of the cadmium oxide present, but represented the onset of vigorous hydrogen evolution for most samples at the relatively high formation rate selected for electrodes of this thickness. The resultant sponge cadmium was discharged at 300 ma to the knee of the discharge curve, the e.m.f. with reference to a mercury-mercuric oxide electrode, being recorded as a function of time.

The pelleting pressure was varied from zero to approximately 60 psi, and electronic conductor content from zero to 45 weight percent. The types of electronic conductor added were as follows: carbonyl nickel powder, INCO types 255 (apparent density 0.6 gm/cm³) and 100 (apparent density 1.5 gm/cm³); hydrometallurgical nickel powder Sherritt Gordon type GO-9 (apparent density 2 gm/cm³); steel wool (2/10 grade cut to give an average fibre length of 3 mm); carbon black; and graphite.

The first experiments were carried out on a mixture of cadmium oxide + 25% INCO type 255 nickel powder. FIG. 1 shows a curve of the pelleting pressure prior to reduction versus minute of discharge to the knee of the discharge curve with vertical lines indicating the extent of reproducibility of the capacity measurements. The delivered capacity decreased somewhat below approximately 1 psi and above 4 psi. The decrease at the lower pressure is thought to be due to a lack of electronic contact, whereas at the higher pressures may be associated with a decrease in the electrolyte-retaining volume, making complete discharge dependent upon transport of potassium hydroxide into the active mass and hence upon the ionic conductivity of the cadmium hydroxide. Subsequent experiments were all carried out using a pellet-forming pressure of 2 psi.

Figure 2:
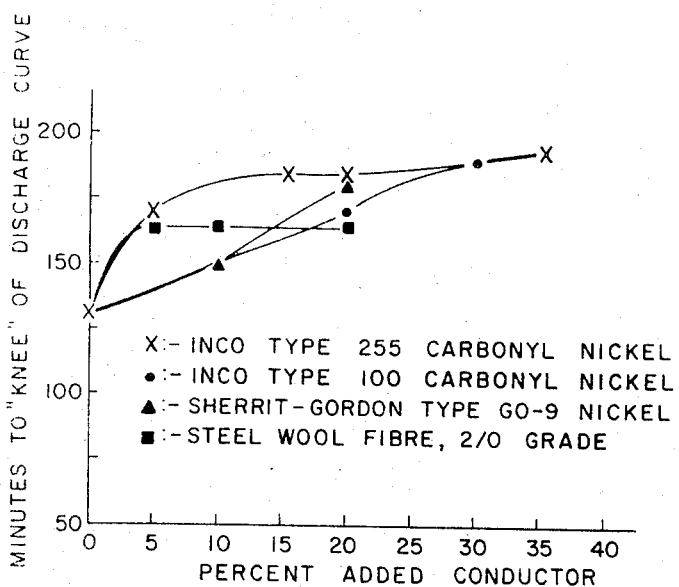

FIG. 2 illustrates the results obtained as a function of type and amount of electronic conductor added to the cadmium oxide. It is seen that on the basis of weight percent of added electronic conductor, the pellets containing the very low density powder (INCO type 255) had run-out times consistently longer than with other additives, although these were closely approached by steel fibre additions for lower percentages of added electronic conductor. Other advantages of this nickel powder are that it is relatively inexpensive and is readily mixed with cadmium oxide to result in an exceptionally high electrode capacity per unit volume. Steel fibre was found to be difficult to handle in that prior to mixing, it had to be cut into very short lengths to prevent "balling" during mixing. Furthermore sponge cadmium blocks containing steel fibre were not as easily sliced as the nickel-containing material. However, as hereinafter described, when individual electrodes were made and the cadmium oxide was well distributed throughout a fibrous steel wool mass, very acceptable electrodes were obtained. The disadvantages of the more dense nickel powders are their costs in terms of effective concentrations and their lower electrode capacity per unit weight and volume. Carbon additions to the cadmium oxide (not shown in FIG. 2) resulted in a substantially more voluminous electrode under the conditions of the present experiments, and were generally more difficult to handle. These observations suggested that the use of the higher pelleting pressures required to make coherent samples of sponge cadmium containing carbon, might result in pellets of rather low porosity.

In order to investigate the effect upon capacity of the cadmium oxide particle size distribution, a sample cadmium oxide powder was separated into fractions having the following particle sizes: (i) less than 45 microns; (ii) 45 – 62 microns; (iii) 62–75 microns; (iv) 75–105 microns; (v) 105–150 microns; (vi) 150–175 microns; and (vii) above 175 microns.

Figure 3:
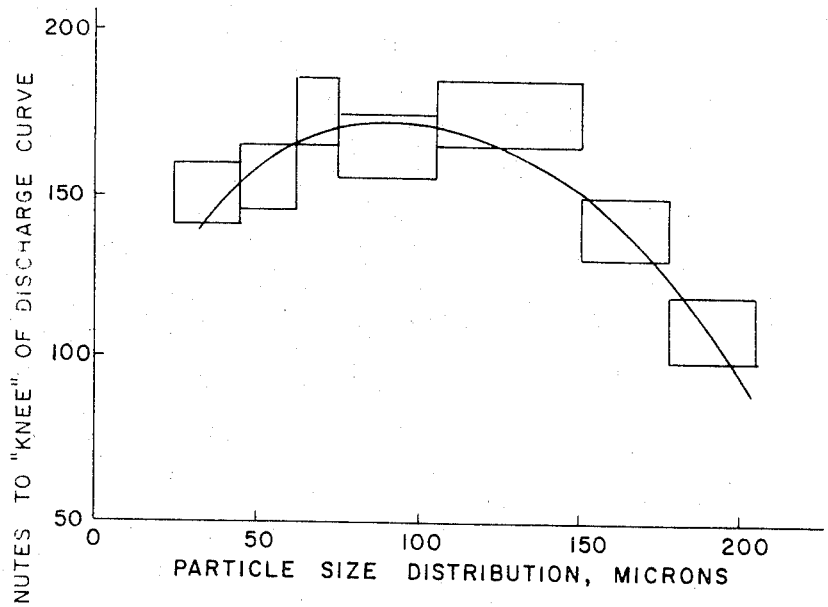

Test electrodes were prepared from each fraction, using mixtures of 3.2 grams cadmium oxide and 0.8 grams INCO type 255 carbonyl nickel powder compressed into pellets at 2.0 psi prior to reduction. FIG. 3 shows discharge time at 300 ma to the "knee" of the discharge curve (with the vertical height of the boxes indicating extent of reproducibility as in FIG. 1) as a function of particle size. These observations suggest an optimum distribution in the range of 50 to 150 microns. The decrease in delivered capacity for particles less than 50 microns may be attributable to a decrease in the net electronic conductivity of the active mass, and therefore could probably be improved by increasing the pelleting pressure e.g. up to 4 psi or even more, or the proportion of nickel powder. The capacity decrease observed for larger particles was anticipated, because the lack of porosity of cadmium produced by reduction of the large particles would be comparable with that of pellets formed at higher pressure (see FIG. 1). It is believed that, in production, sieving to remove only the larger particles, namely over 150 microns, is all that would be required.

The fraction of cadmium utilized during discharge was found to be dependent to some extent upon the thickness of the pellet. For example, one electrode was prepared from the 105 to 150 microns fraction using 2.14 grams of cadmium oxide and 0.5 grams nickel powder, and otherwise treated as in the samples hereinbefore described. When discharged at 300 ma (3.3 hr. rate) the cadmium utilization to the discharge curve knee was 65 percent of the theoretical value, whereas the corresponding 3.2 gram sample, discharged at 300 ma (5 hr. rate), yielded less than 60 percent of the theoretical value.

DESCRIPTION OF THE PREFERRED EMBODIMENTS

A number of electrodes were fabricated and incorporated into test cells. The electrode configurations selected for study were those compatible with (a) the C size manganese dioxide alkaline cell (1.5 AH), (b) the 1,450 size (4.5 AH) mercuric oxide-zinc cell, and (c) cells having electrodes 25 mm. square by approximately 6 mm. The cylindrical negative electrode sizes corresponding to (a) and (b) were: (a) 12 mm outside diameter, 30 mm length; and (b) 28 mm outside diameter, 5 mm length.

Cell No. 1

Figure 4:
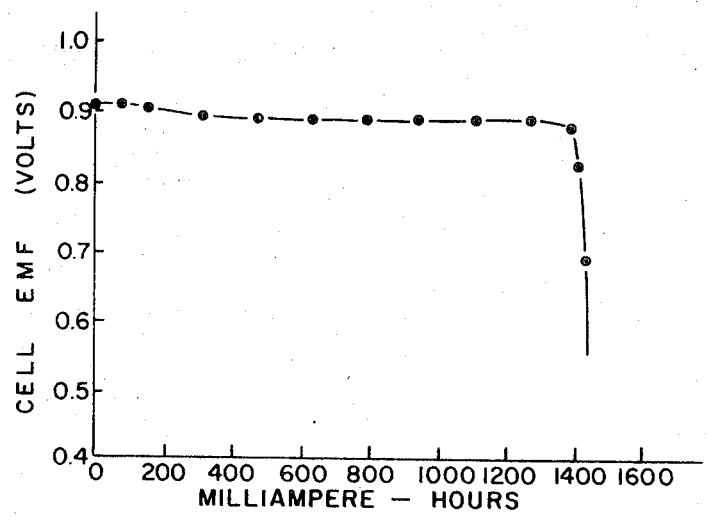
FIGS. 4 to 6 are graphs depicting discharge curves relating to the cells referred to below as Nos. 1 to 3 respectively.

The cadmium electrode used in this cell was made as follows:

Reagent grade cadmium oxide mixed with 25% by weight INCO type 255 carbonyl nickel powder was packed dry into a 10 × 50 mm Soxhlet extractor thimble loosely filled with 2/0 steel wool, and subjected to low pressure (less than 10 psi). Thimble and contents were then transferred to potassium hydroxide solution for electrolytic reduction. The cathode was manganese dioxide. During the first cycle, this cell was discharged through a 10 ohm resistance (20 hour rate), the discharge curve being shown in FIG. 4. This represents more than 75% of the cadmium electrode capacity. The cell was then recharged for 17 hours at 100 ma. During recharge, the negative electrode was reduced to cadmium with the evolution of hydrogen during overcharge, whereas the positive electrode was oxidized from a lower valence state of Mn to $MnO_2$. The cell was shunted with diodes to limit the charging voltage to 1.4 – 1.5 volts to preclude the possibility of producing manganate. Even though the cell top was but crudely closed, there was no evidence of electrolyte having been forced from the cell by gas evolution. When recharging on a number of subsequent cycles without diode voltage-limiting, the capacity fell off suggesting that manganate migration to the negative electrode had occurred.

Cell No. 2

Figure 5:
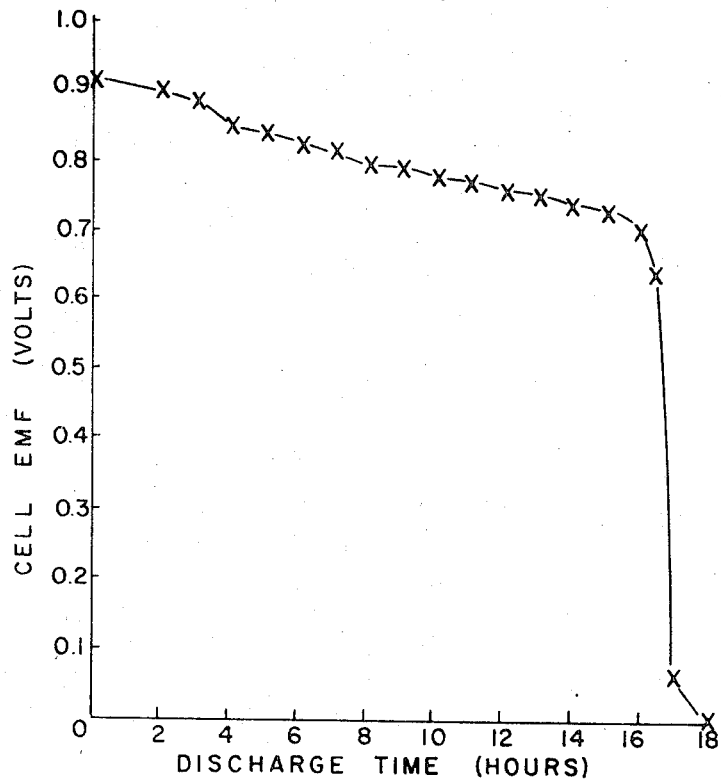

The positive (manganese dioxide) electrode from a C cell was pulverized, moistened and pressed in a mould at 15,000 psi to give a square electrode of dimensions 25 × 25 × 6 mm, having a capacity of approximately 750 ma hour. A piece of sponge cadmium of similar size was cut from stock electrode fabricated as indicated for the electrode of Cell No. 1, but cut from a larger piece of material. This was assembled into a cell with the manganese dioxide electrode using a Visking separator and an outer sheath of polyethylene film and masking tape. The 20 hours rate discharge at room temperature is depicted in FIG. 5.

Cell No. 3

Figure 6:
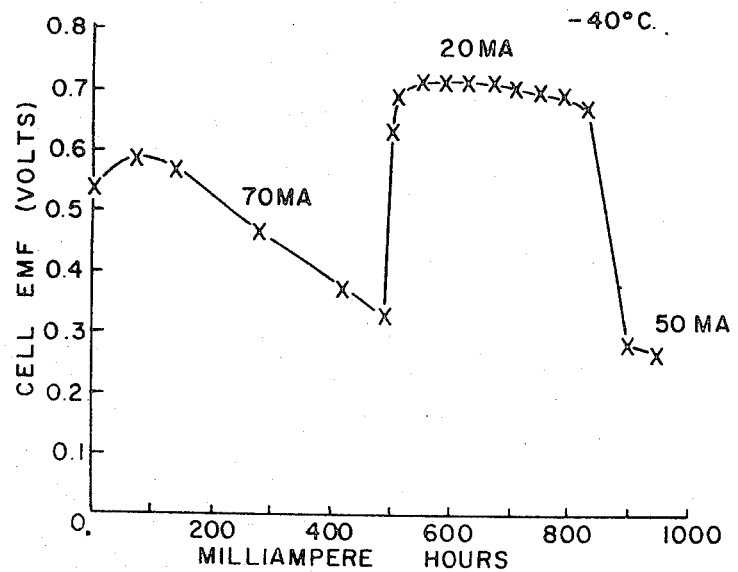

This cell used a Mallory 1450R mercuric oxide cathode and cell case and the anode was prepared as for Cell No. 1 to give a sponge cadmium electrode of 25 mm diameter and 6 mm in length, with a theoretical capacity of approximately 3 amp hours. The electrolyte was low carbonate 30% potassium hydroxide solution. The discharge curve of the cell at −40° is shown in FIG. 6.

Cell No. 4

This cell used the same electrolyte, cathode and case as cell No. 3 and the anode used was prepared as follows: Reagent grade cadmium oxide was made up to a thin paste with water and caked on a piece of filter paper in a 30 mm diameter polypropylene suction filter having a loosely-packed layer of 2/0 grade steel wool. The filter was transferred to potassium hydroxide solution, and the cadmium oxide reduced electrolytically in situ. 2/0 steel wool was used to promote electronic conductivity. The theoretical capacity was approximately 3 amp hours. The discharge curve for discharge at 80 ma shown in FIG. 7 (Curve I) indicates a substantial and increasing polarization with time, but with 65% utilization of the cadmium.

Cell No. 5

Figure 7:
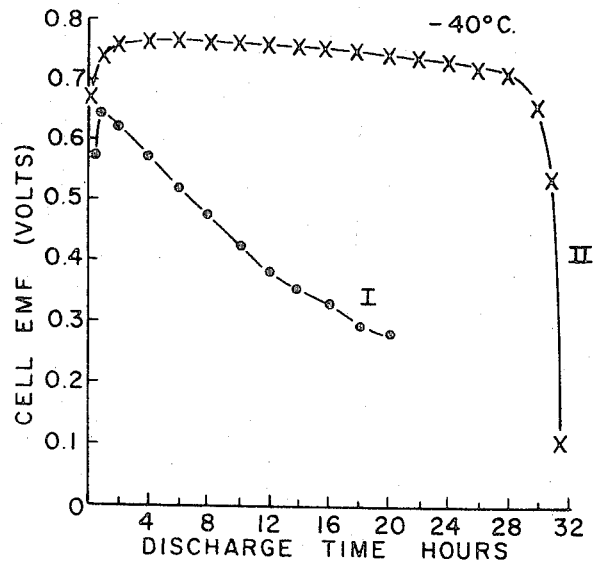
FIG. 7 is a graph depicting discharge curves relating to cell Nos. 4 and 5.

A portion of the mercuric oxide cathode from a fresh Mallory 1450R cell was crushed and then compressed at 15,000 psi to form an electrode of dimensions 25 × 25 × 5 mm. This electrode was used in a cell with two similarly shaped pieces of sponge cadmium cut from a larger piece of material as indicated for the electrode of Cell No. 2 using a Visking separator and 30% potassium hydroxide electrolyte. The outer container was formed from a layer of polyethylene film held in place by rubber bands. The −40°C discharge curve at 30 ma is shown in FIG. 7 (Curve II). Following this, the discharge of the cell was continued at room temperature at 40 ma. The voltage was very constant at 0.86 v for at least 12 hours. Following this discharge, the cell was recharged for 4 hours at 300 ma and discharged again at room temperature at 43 ma. A flat discharge was obtained for 43 hours, after which time the voltage dropped rapidly.

EXAMPLE 1

When the cadmium oxide-nickel mixture referred to in the description of cell No. 1 was packed as described into an expanded nickel mesh basket, the discharge capacity increased to about 80% at the 20 hour rate.

EXAMPLE 2

Larger electrodes of sponge cadmium were prepared from the cadmium oxide −25% nickel mixture in the manner described under Cell No. 1, in order to determine whether these could satisfactorily be cut into smaller pieces for cell assembly. The first electrode formed was a flat plate of dimensions 125 × 60 × 6 mm which was held in a nickel foil container for electrolytic reduction. The surface layers of sponge cadmium tended to break away from the balance of the plate, but results indicated that with suitable quality control in the preliminary shaping of the cadmium oxide-nickel powder slab the material could be handled with ease. The second electrode prepared was in the form of a 1 ⅛ inch diameter round bar of length 6 inches prepared in a nickel mesh basket. This electrode was formed as a source of disc shaped electrodes, and was given a preliminary discharge at the 100-hour rate and delivered 85% of the theoretical electrode capacity. The electrode was subsequently recharged and sliced into discs.

The experiments hereinbefore described indicated furthermore that cells using sponge cadmium electrodes prepared according to the present invention show good low temperature operation, particularly by comparison with corresponding batteries using zinc cathodes. Moreover, the long-term stability of the cells important for "shelf life", makes them an attractive commercial proposition as primary batteries.

What we claim as our invention is:

1. A process for the preparation of sponge cadmium electrode material which comprises the steps of compressing a mixture of cadmium oxide and finely divided electronic conductor, said electronic conductor being present in an amount of 5 to 25 percent by weight of the total mixture, and being inert towards alkaline electrolytes, at a pressure of at least 1 psi but not exceeding 100 psi, providing an electrical connection to said compressed mixture, and subsequently electrolytically reducing said cadmium oxide in an alkaline electrolyte.

2. A process as claimed in claim 1 wherein said finely divided electronic conductor is finely powdered nickel.

3. A process as claimed in claim 2 in which said finely powdered nickel is a nickel powder having an apparent density less than 2 gm/cm$^3$ and is present in an amount of between 10 and 25 percent by weight of the total mixture.

4. A process as claimed in claim 3 wherein said nickel powder has an apparent density less than 1 gm/cm$^3$.

5. A process as claimed in claim 4 in which said cadmium oxide is a powder of particle size between about 50 microns and about 150 microns.

6. A process as claimed in claim 3 wherein the cadmium oxide is a powder of particle size between about 50 microns and 150 microns and wherein the electronic conductor is finely powdered nickel of apparent density less than 1 gm/cm$^3$.

7. A process as claimed in claim 1 wherein said pressure is between 1 and 4 psi.

8. A process as claimed in claim 7 wherein said cadmium oxide is a powder of particle size less than 175 microns.

9. A process as claimed in claim 7 wherein said cadmium oxide is a powder of particle size between about 50 microns and about 150 microns.

10. A process as claimed in claim 1 wherein said finely divided electronic conductor is a metal in filamentary form.

11. A process as claimed in claim 10 wherein the metal in filamentary form is steel wool, nickel wool or electrolytic copper wool.

12. A process as claimed in claim 1 wherein after reduction of the cadmium oxide the material is subsequently cut or shaped to the configuration and size required of the final electrode.

13. A process as claimed in claim 1 wherein the mixture of cadmium oxide and electronic conductor is compressed to form an electrode of the configuration and size required of the final electrode.

* * * * *

UNITED STATES PATENT OFFICE
CERTIFICATE OF CORRECTION

Patent No. 3,775,273     Dated November 27, 1973

Inventor(s) Haines, Ronald L., etc.

It is certified that error appears in the above-identified patent and that said Letters Patent are hereby corrected as shown below:

In the heading, between the filing data for the application and the international class data, insert:

--Claims priority, application Canada,
   filed January 24, 1969, 41,100--

Signed and sealed this 16th day of July 1974.

(SEAL)
Attest:

McCOY M. GIBSON, JR.
Attesting Officer

C. MARSHALL DANN
Commissioner of Patents